US00RE35984E

United States Patent [19]

Fadell et al.

[11] E Patent Number: Re. 35,984

[45] Reissued Date of Patent: Dec. 8, 1998

[54] PROCESS FOR MOLDING A FIBERGLASS REINFORCED ARTICLE

[75] Inventors: James A. Fadell, Toledo, Ohio; Stephen E. Gross, Littleton, Colo.

[73] Assignee: Johns Manville International, Inc., Denver, Colo.

[21] Appl. No.: 332,675

[22] Filed: Nov. 1, 1994

Related U.S. Patent Documents

Reissue of:

[64] Patent No.: 5,232,771
Issued: Aug. 3, 1993
Appl. No.: 758,646
Filed: Sep. 12, 1991

[51] Int. Cl.[6] ..... D04H 1/58

[52] U.S. Cl. ..... 442/331; 442/340; 442/344; 442/348; 264/116; 264/122; 264/257; 264/DIG. 53; 428/903

[58] Field of Search ..... 428/288, 297, 428/903; 264/116, 122, 257, DIG. 53; 442/331, 340, 344, 348

[56] References Cited

U.S. PATENT DOCUMENTS

| | | | |
|---|---|---|---|
| 3,932,573 | 1/1976 | Kucsma et al. | 264/118 |
| 4,666,645 | 5/1987 | Prewo et al. | 264/87 |
| 4,801,626 | 1/1989 | Auerbach et al. | 523/208 |
| 4,886,701 | 12/1989 | Ehnert et al. | 428/282 |
| 4,892,695 | 1/1990 | Bainbridge et al. | 264/119 |
| 4,913,956 | 4/1990 | Fay et al. | 428/285 |
| 4,927,579 | 5/1990 | Moore | 264/101 |
| 4,946,738 | 8/1990 | Chenoweth et al. | 422/284 |
| 4,957,415 | 9/1990 | Paul et al. | 416/245 R |

*Primary Examiner*—Christopher W. Raimund
*Attorney, Agent, or Firm*—Robert D. Touslee

[57] ABSTRACT

A process for producing fiberglass reinforced molded articles of superior surface quality involves preparation of a mat of glass fiber comprised of a majority of fibers having a diameter of less than one micron and a minority of fibers having a diameter greater than one micron. A sizing is applied to the fibers. The sizing includes a coupling agent preselected to be compatible with the moldable material, e.g. nylon. The glass fiber mat is comminuted into pieces shaped and dimensioned for combination with the moldable material to form a composite having a range of to 50% of glass fiber by weight. The composite is then molded by a conventional process to yield a fiberglass reinforced article with superior surface quality.

14 Claims, 1 Drawing Sheet

PROCESS FOR MOLDING A FIBERGLASS REINFORCED ARTICLE

Matter enclosed in heavy brackets [ ] appears in the original patent but forms no part of this reissue specification; matter printed in italics indicates the additions made by reissue.

TECHNICAL FIELD

This invention relates to a process for producing fiberglass reinforced molded articles of superior surface quality.

BACKGROUND ART

Fiberglass is used to reinforce molded articles molded of plastic and elastomerics to enhance their mechanical strength and dimensional stability over thermal operating cycles.

The mechanical strength of a fiberglass reinforced plastic article has a direct relationship to the quantity of fiber glass contained within the moldable plastic. Also, the thickness of the glass fibers contributes to the mechanical strength of the article.

However, as the thickness of the glass fiber increases so does its prominence and visibility in the surface of the plastic molded article. A relatively coarse glass fiber impairs the smoothness and appearance of the surface of the article, and makes it unacceptable for product applications which require high surface quality, such as exterior body panels and trim components of automobiles unless additional processes or materials are used to finish the surface.

The prior art has addressed the problem of surface quality degradation by glass fiber reinforcement by techniques which are intended to mask the reinforcing fibers. These techniques increase the complexity and cost of manufacturing fiberglass reinforced plastic articles in high volume at commercial quality levels.

The service demands and operating environments of many plastic molded articles, such as automotive body panels and trim pieces, require mechanical strength and thermal stability which may be achieved by fiberglass reinforcement. The difficulty with the use of fiberglass in the molding of such articles has been its degradation of their surface quality.

The practical problem thus defined is the molding of a fiberglass reinforced plastic article Which enjoys the superior mechanical strength and thermal stability contributed by fiberglass without the impairment of surface quality. This problem is the subject of the published Japanese Patent Application titled "Glass Fiber-Reinforced Resin Composition," Application No. 60-21947, filed Feb. 8, 1985 by Hiromichi Uohashi and Tetsuji Kodaira, and published Aug. 16, 1986. That application discloses a glass reinforced plastic composition which employs glass fibers of diameter and length below preselected dimensional limits.

However, the patent does not address the problem of mixing the fibers with the plastic so that they become consistently spread throughout the plastic material. This problem is particularly acute with micro-fibers. The small, hair-like nature of such glass strands makes their intermixture with polymer resins difficult. Moreover, clusters of such fibers are not easily separated in a viscous polymer emulsion to provide a homogeneous dispersion of fibers in the polymer.

DISCLOSURE OF THE INVENTION

The present invention addresses the problem of surface impairment by fiberglass reinforcement of plastic articles by providing a process in which glass reinforcing fibers are combined with a moldable material to provide a composite with sufficient density and homogeneity of the glass fibers to ensure thorough mixing of the fiber with the moldable plastic to improve mechanical strength and thermal stability over previously known micro-fiber composite materials without substantial impairment of surface quality. The invention uses the characteristics of high surface area, resiliency, and large aspect ratio of fine diameter glass fibers to provide property enhancement to plastic and elastomeric moldable materials.

The inventive process involves preparation of a mat comprised of a majority of glass fibers having a diameter of less than one micron, and a minority of glass fibers having a diameter greater than one micron. The submicron glass fibers are the dominant constituent of the bulk glass reinforcement material, and their density in the mat is matched to the mechanical strength and thermal stability requirements of the molded article. The presence of a minor portion of glass fibers of diameter greater than one micron is for the purpose of providing a carrier for the sub-micron fibers. The quantity of such larger diameter fibers is selected to be the minimum required to carry the sub-micron fibers without substantial surface impairment.

The glass fibers are treated with sizing to enhance the intermixture of the fibers with a polymer. The binding of the glass fibers to the moldable plastic is also improved by sizing with a compatible material. For example, if the moldable plastic is nylon, a nylon-compatible sizing having appropriate selected keying agents, binders, and wetting agents.

The sized, glass fiber mat is then dried and comminuted into pieces of shape and dimension suited for intermixture with a more substantive quantity of polymer determined by the surface finish and mechanical strength specifications of the finished product. In the preferred embodiment, the mixture is prepared for feeding to a plastic molding machine such as an injection molder.

The pieces of glass fiber mat are combined with a moldable plastic or elastomeric material in a composite having a range of 2% to 50% of glass fiber by weight. The specific weight ratio is chosen based on the desired physical properties of the molded article.

Alternatively, the fiberglass reinforced plastic article may be formed as a panel which is stamped or molded to a desired shape having requisite mechanical strength and thermal stability without substantial impairment of surface quality.

BEST MODE FOR CARRYING OUT THE INVENTION

Figure 1:
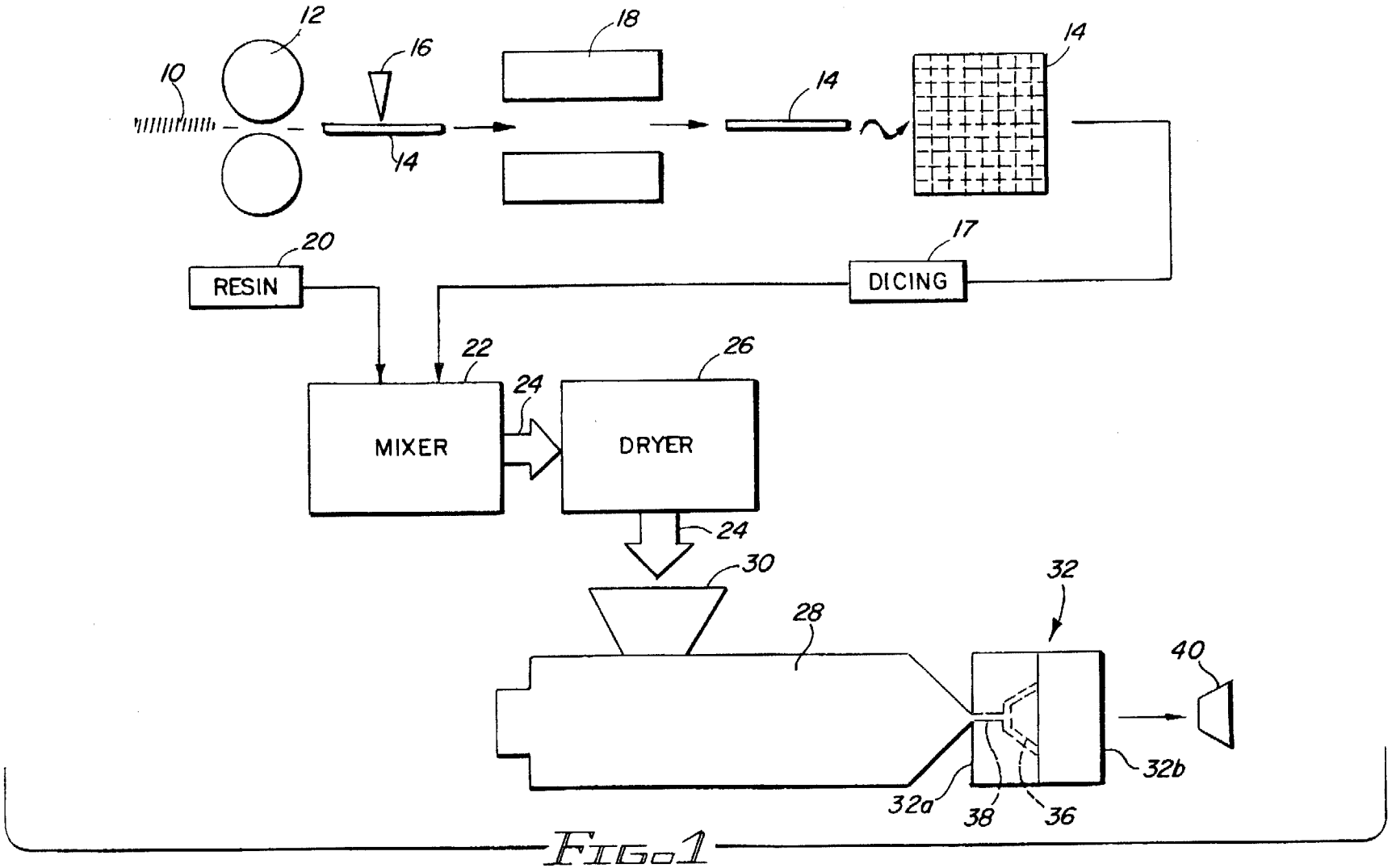
FIG. 1 is a schematic view of the process of the present invention in which a fiberglass reinforced article is molded from a composite which includes a fiberglass constituent having a majority of glass fibers having a diameter less than one micron and a minority of glass fibers having a diameter greater than one micron.

In FIG. 1 bulk glass fibers 10 are formed into a thin paper sheet or mat 14 by a conventional wet slurry process. A pair of rollers 12 indicate schematically the feeding of a slurry of bulk fibers 10 through roller stations in the mat forming process.

The bulk fibers 10 are constituted of a majority of fibers having a diameter of less than one micron, and a minority of fibers having a diameter greater than one micron. A suitable proportion by weight may be 20% of a 3.0 micron glass fiber product and 80% of a 0.65 micron glass fiber product. The submicron diameter fibers may range in diameter from 0.2 micron up to 1 micron, and their weight may comprise 50–90% of the mat weight. The larger diameter fibers may range in diameter from about 3 microns to 18 microns, and they may constitute 10 to 50% of the mat weight.

The primary function of the larger diameter glass fibers is as base carriers for the finer fibers in the wet slurry process, and secondarily in contributing to the mechanical strength of the molded article. The presence of the finer fibers in requisite density lends the preponderant mechanical strength to the molded article.

The glass fiber mat 14 receives an application of sizing, as indicated schematically by applicator 16. Any number of conventional methods of applying sizing may be used. For example, the glass fiber mat may be impregnated with sizing by either a spray application, submersion in a bath, addition of sizing in the wet slurry process, or a curtain coat method. Other known sizing application techniques could serve as well, such as precipitate techniques including pH adjustment or polyelectrolyte addition.

The sizing is preselected to be compatible with the chemistry of molded material to be used. Typical sizing chemistries include silicones, organofunctional silanes and resin systems that are specific to the moldable material to be combined with the glass fiber. For example, if the moldable material is duPont Zytel Nylon/6, the sizing would be selected from a group which uses aminosilane as the coupling agent, for example, Manville Star Strand 761. Other types of moldable materials, such as polyester, ABS, polypropylene, polyethylene and the like, have commercially available coupling agents compatible with these materials. Sizings typically have a solids content in the range of 0.1% to 20%, and are applied so that 0.1% to 15% of the weight of the fiberglass mat is due to the sizing.

In the preferred embodiment, the sizing operation includes coating the fiber with a latex compatible with or the same as the thermoplastic or thermoset material which is to be reinforced by the glass fiber. For example, a polyvinyl chloride (PVC) latex will be used to coat fiber intended for reinforcement of PVC product. Preferably, an aqueous slurry, commercially referred to as an emulsion, includes up to 50% latex for treating the bulk fibers 10. In a working example, coupling agents included 0.27% gamma-aminopropyltriethoxysilane, e.g. Union Carbide A-1100, and 0.18% triaminofunctional silane, e.g. Union Carbide A-1130. These coupling agents were mixed with 0.08% lubricant, i.e. Emerlube 7440, 0.51% film former, i.e. Poly Em 40 polyethylene emulsion, and 98.96% Water to form a sizing for the micro fibers made of E-Glass. Since the slurry is sufficiently dispersed about the fiber, the latex can coat the fiber to protect it during handling and compounding. Moreover, the sizing of the example, and particularly the coupling agents, would be compatible with a wide variety of thermoplastic as well as thermoset materials, including but not limited to polypropylene, polycarbonate, styrenes, phenolics and epoxies.

The sized mat 14 can be easily handled and processed as in a chopping operation. When the mat 14 is comminuted, the fiber is reduced in bulk by an order of magnitude which will aid in the volume of material that can be handled in a subsequent mixing operation with the latex material.

Furthermore, the fiber is encapsulated so as to be in a non-rritating form during handling for the mixing operation. Additionally, the latex-coated fibers can form an intimate bond with the polymer it is reinforcing. Moreover, less severe processing will be required to homogenize the coated glass in the latex master batch than would be necessary for bulk fiber.

The sized fiberglass mat 14 is then dried in the oven indicated schematically at 18.

The fiberglass mat 14 is then comminuted as at 7 into pieces of shape and dimension suited for combination with the moldable material to allow the fiberglass to mix and flow in the molding operation. The mat 14 may be cut into elongated strips, diced into small pieces, or reduced to match the size of thermoformable sheets. The size and shape is dependent on the stock form of the moldable material. If the moldable material is to be thermoplastic or thermosetting resin pellets, the fiberglass mat 14 will be diced into fine pieces to facilitate the mixing and homogeneity of the moldable composite, e.g., in pieces about one-half inch (½) square and 0.000–0.100 inch thick. In such a case the diced glass fiber mat Would be mixed with a controlled quantity of resin 20 in a mixer 22 to produce a moldable composite 24 having the correct ratio by weight of plastic resin to fiber glass to produce a molded article of desired mechanical strength and thermal stability.

The [multiple] *moldable* composite 24 may be dried in a dryer 26 preparatory to being molded to rid the composite of volatile contaminants.

In the example of FIG. 1, the [multiple] *moldable* composite is a combination of resin pellets and comminuted fiberglass mat pieces which is fed to the hopper 30 of a conventional plastic injection molding machine indicated by 28. The machine 28 heats the composite to the processing temperature of the resin, and then injects the fluent moldable composite into an injection mold, indicated at 32. The mold 32 includes mold halves 32(a) and 32(b). The article to be molded is defined by a cavity 36 within the mold 32. The cavity is communicated to the injection nozzle of the machine 28 by a sprue 38.

After completion of the molding cycle, the mold halves 32(a) and 32(b) are separated and the solid molded article 40 is ejected from the mold. The molded article 40 will exhibit superior surface quality without substantial degradation or impairment by the presence of glass fibers. The molded article 40 will enjoy mechanical strength and thermal stability by the presence of well dispersed glass fiber reinforcement, including the preponderant submicron diameter glass fiber constituent.

Although the process of the present invention has been shown and described in reference to an injection molding application, it is understood that the process may be adapted for use with extrusion molding, sheet molding, bulk molding, and other types of other molding processes and materials which admit to reinforcement of a moldable material with glass fibers.

What is claimed is:

1. A process for molding an article reinforced with glass fiber without substantial impairment of surface quality comprising the steps of:

preparing a mat of glass fiber *from bulk glass fiber* comprised of a majority of *smaller diameter* glass fibers having a diameter less than one micron and a minority of *larger diameter* glass fibers having a diameter greater than one micron by applying to *the* bulk *glass* fiber sizing including up to 50% by weight of polymer compatible with [the] *a* moldable plastic material;

comminuting the mat of glass fiber into *glass fiber mat* pieces shaped and dimensioned for combination with [a] *the* moldable *plastic* material;

combining the glass fiber *mat* pieces with the moldable *plastic* material to define a moldable composite having a range of 2% to 50% of glass fiber by weight; and molding the article from the composite.

2. The process of claim 1 wherein the majority of submicron glass fibers comprise 50–90% of the weight of the [article] *bulk glass fiber.*

3. The process of claim 1 wherein the larger diameter glass fibers have diameters in the range of [6] *3* to 18 microns.

4. The process of claim 1 wherein the smaller diameter glass fibers have diameters in the range of 0.2 to 1 micron.

5. The process of claim 1 wherein the article is injection molded.

6. The process of claim 1 wherein the moldable *plastic* material is a thermoplastic resin.

7. The process of claim 1 wherein the moldable *plastic* material is a thermosetting resin.

8. The process of claim 1 wherein the mat of glass fiber [product] is comminuted by cutting.

9. The process of claim 8 wherein the mat of glass fiber [product] is cut into elongated strips.

10. The process of claim 8 wherein the mat of glass fiber [product] is diced.

11. An article made in accordance with the process of claims 1, 2, 3, 4, 5, 6, 7, 8, 9 or 10.

12. The process as defined in claim 1 wherein said polymer [is] *and* said moldable plastic *are the same* material.

13. A process for making fiber-reinforced polymer products comprising:

forming a layer of bulk fiber with a majority of parts by weight of glass fibers of less than 1 micron;

applying a sizing to said layer of bulk fiber including up to 50% of a predetermined polymer, said predetermined polymer being compatible with the polymer to be reinforced by the fiber;

drying said sized layer of bulk fiber to form a mat;

comminuting said mat into pieces and mixing said pieces with said [predetermined] polymer *to be reinforced* to form a moldable composite; and molding the product from said composite .

14. The process as defined in claim 13 wherein said sizing comprises an aqueous emulsion.

* * * * *